United States Patent Office 3,420,698
Patented Jan. 7, 1969

3,420,698
METHOD OF STAINING GLASS AND GLASS STAINING COMPOSITIONS
Allison L. Smith, Vineland, N.J., assignor to Owens-Illinois, Inc., a corporation of Ohio
No Drawing. Filed Oct. 5, 1964, Ser. No. 401,718
U.S. Cl. 117—124    2 Claims
Int. Cl. C03c 21/00

ABSTRACT OF THE DISCLOSURE

Staining compositions for staining glass containing cuprous sulfide, silver oxide, lead metaborate and zinc sulfide which is applied to the glass and thereafter fired to a temperature sufficient to bake the composition and which produce a deep staining effect.

---

The present invention relates to glass staining and more particularly to the method of staining borosilicate glasses that do not contain reducing agents. The present invention also relates to glass staining compositions.

The art of glass staining has been practiced for many years and as a term of art refers to the coloration of a glass surface by ionic migration and in this respect differs from colored glasses which are normally made by adding coloring ingredients to a molten glass batch and, moreover, also differs from other coloring methods that leave a separate layer of coloring matter on the glass surface.

It is known in the art to stain glass by employing compositions containing copper or silver compounds of various types or mixtures thereof. These compounds are most usually mixed with a suitable vehicle to form a slurry or paste which is then applied to the glass surface to be stained. Thereafter the glass surface is baked at an elevated temperature and the staining effect takes place as a result of an ion-exchange mechanism wherein it is believed that the metallic ions of the compounds of the stained composition migrate into the glass structure in exchange for alkali ions of the glass and as a result the migrated metallic ions become a part of the glass structure. In a second step a chemical reduction reaction takes place wherein the coloring ions are reduced to atoms. Finally, the atoms in question are joined together to form sub-microscopic particles or color centers.

In some glasses the second step or chemical reduction takes place and is brought about by means of a reducing agent contained within the glass composition itself. Arsenic is perhaps the element which is most widely used for this purpose.

In those glasses containing no effective amounts of reducing agent in the staining of these glasses the reduction of the ions to atoms is accomplished by exposure of the stained glass surface to a reducing atmosphere at high temperature. For these purposes a hydrogen containing atmosphere is sometimes used. Such a staining process consists of the following stages:

(1) Apply staining compound to the glass. This implants color producing metallic ions in the glass.

(2) Fire in air at an elevated temperature usually in the annealing range for the glass.

(3) Remove inert residue remaining on the glass surface by brushing, buffing or washing. Occassionally, a muriatic acid wash is employed for this purpose.

(4) Reheat the ware, this time to a reducing atmosphere to develop color.

One of the most common uses for staining compositions is in the production of precision laboratory glassware as for example: graduates, pipets, beakers, thermometers and the like. Many of these objects of laboratory equipment are made of special glass resistant to thermal shock, chemical attack and the like. Heretofore staining compositions which have been satisfactory for use in staining ordinary glasses, such as soda-lime glasses, have not been entirely satisfactory with glasses of special composition and characteristics that are employed for the production of precision laboratory equipment. For example, laboratory glassware is often made of borosilicate glass because of its excellent resistance to chemical attack and thermal shock, however, it is extremely difficult to obtain a satisfactory stain color in borosilicate glass because they are free of arsenic or other reducing agents. Existing commercial staining preparations normally yield a pale color when applied to glasses such as borosilicate glasses.

It would therefore be desirable to obtain a glass staining composition which would be capable of producing a satisfactory stain color on glasses such as borosilicate glasses and other glasses free of reducing agents. In addition it is desirable to obtain a glass staining composition which will permit printing of sharply defined designs and be free of the undesirable side effects of previously employed staining compositions.

Accordingly, it is an object of the present invention to stain glass, particularly borosilicate glass that is free of reducing agents, with a staining composition that will avoid the shortcomings and disadvantages of prior used stains.

It is a further object of the present invention to provide a staining glass, particularly borosilicate glass that is free of reducing agents, to produce a desirable stain color and good definition and sharpness in the image.

It is a further object of the present invention to provide glass staining compositions, particularly for borosilicate glasses free of reducing agents, which will produce a desirable stain on glass surfaces.

In attaining the above objects, one feature of the present invention resides in a staining composition containing cuprous sulfide, a compound of silver, lead metaborate and zinc sulfide.

A further feature of the present invention resides in applying to a glass surface according to a predetermined pattern or design, a staining composition comprising cuprous sulfide, a compound of silver lead metaborate and zinc sulfide and thereafter firing the said glass surface and effect the desired staining of the glass.

Other features, objects and advantages of the present invention will become apparent from the following detailed description thereof.

According to the present invention an improvement for staining glasses, particularly borosilicate glasses which are substantially free of arsenic or other reducing agents, is provided by employing a glass staining composition which contains the following ingredients, all percentages hereinafter being based on dry weight.

| | Percent |
|---|---|
| Cuprous sulfide, $Cu_2S$ | 90 to 99 |
| Silver oxide, $Ag_2O$ | Up to 2 |
| Lead metaborate, $Pb(BO_2)_2$ | Up to 3 |
| Zinc sulfide | Up to 3 |

It is understood that various other forms of silver may be used in place of the silver oxide, such as silver sulfide or silver sulfate.

The method comprises applying a mixture of the above ingredients together with a vehicle to the surface of the glass to a predetermined design of lines, characters and the like. After application of the above staining composition, the glass and applied stain are fired to a temperature sufficiently high to bake the stain composition but insufficient to deleteriously affect the stain and lower than the temperature which would cause deterioration, distortion, stresses or the like in the glass itself. Generally, the staining compositions of the present invention will produce the desired stain coloration when fired in air on an annealing schedule for about 20 minutes at 1025° F. with a peak of about 1030° F. The color of the stain can be varied depending on the proportions of the ingredients although dark reds are most preferred.

In the preferred embodiment of the present invention the stain composition has the following formulation:

| | Percent |
|---|---|
| Cuprous sulfide | 95 |
| Silver oxide | 1 |
| Lead metaborate | 3 |
| Zinc sulfide | 1 |

Stain compositions of the above formulation are normally mixed with a suitable printing vehicle such as squeegee printing oil which is believed to contain materials such as rosin oil, pine oil and the like to form a paste-like consistency which is then applied to the glass.

It is preferable when applying the stains of the present invention to subject the stain composition to a two-stage firing process of first firing in air similar to the conditions set forth above and then continuing the firing in a reducing atmosphere such as hydrogen for a sufficient period of time and at approximately the same temperature so that the desired stain coloration is fully developed. The stain compositions normally give the yellow coloration after the initial firing in air. Interposed between the initial firing in air and the ultimate firing in a reducing atmosphere, an optional removal of the burned residue of the stain can be carried out. The burned residue should be removed before the second firing step to preserve the sharp outline in a designed image. This can most easily be accomplished by washing either with water or with material such as muriatic acid.

In the practice of the present invention, the vehicles used to apply the stain compositions are the usual screen printing oils, namely, organic oils similar to pine oil and rosin oil which do not react with the solid inorganic stain ingredients. The oils burn off before reaching the temperature at which the staining reaction and ion exchange takes place. The exact nature of the dispersing medium, better known as the vehicle, utilized in the stain composition of the present invention is not particularly critical. The amount of vehicle employed in making the stain composition can be varied and it is at least enough to form sufficient surface adhesion to transfer a proper amount of the mixture to the surface of the glass.

In making the staining composition of the present invention and before application to the glass surface in the desired manner, the mixed ingredients are compounded and pulverized to less than about 30 microns, preferably less than 10 microns grain size. It has been noted that this size is particularly useful in achieving the desired results in the present invention and aids in obtaining a more uniform color and a more sharply defined printed image. The solid ingredients in finely divided form are milled together with the vehicle until a paste-like consistency is achieved. The proportions of vehicle to dry solids can be varied to achieve the desired consistency for any particular application, and for example, the proportions by weight of stain powder to oil may range between 100 to 3 and 100 to 40. The former is preferable, but the desired consistency is dependent upon the oil viscosity, the stain particle size and the method of milling or blending the oil with the stain. The desired consistency is that of a very soft paste that can be made to flow through the screen stencil only by the application of a squeegee blade.

Any of the usual methods can be employed in applying the stains of the present invention including stencil screen, offset printing and the like. To illustrate, using a stencil screen of the desired design or image shot therein, the oil stain mixture is poured onto the screen, thereafter a squeegee is wiped across the screen which presses the staining composition through selected portions of the screen mesh onto the surface of the glass in contact with the underside surface of the stencil screen and thereby forms a predetermined design on the glass. The glass article having the stain composition on its surface forming the desired pattern or image is then readied for the firing.

As pointed out above, the temperature of the baking step is not a critical aspect of the invention and the temperature employed will be determined in part by the melting or softening point of the glasses being stained. Generally, from about 800° F. to about 1100° F. is suitable although this can be varied.

The coloration is produced as a result of the migration of the silver and copper ions into the glass structure in exchange for the alkali ions of the glass composition in the vicinity of the stained area. The staining composition of the present invention is particularly effective in promoting the availability of metallic ions to migrate and also serves to promote egress of alkali ions out of the glass. In the course of heating the stained glass surface during the baking step, the sulfur containing compounds provide a sulfide atmosphere which may also contain sulfide dioxide in the immediate vicinity of the stain area.

The desired red-orange hue is obtained with a silver oxide content between about 0.75% and 1.25%. Greater or smaller proportions of silver oxide will produce brown or ruby colors, respectively. A 1% silver oxide content is a convenient amount for production purposes and is preferred for purposes of the present invention.

Although the invention has been described with reference to borosilicate glasses, the stains can be applied and are suitable for application to other types of glasses such as soda lime, aluminosilicate and lead glasses.

I claim:
1. A method of staining glass which comprises applying to a glass surface a staining composition comprising 95% cuprous sulfide, 1% silver oxide, 3% lead metaborate and 1% zinc sulfide, thereafter firing the glass surface at a temperature sufficient to bake the composition and less than the temperature which would deleteriously affect the stain or the glass and effecting the staining thereof.

2. A staining composition for use in the staining of glass that is free of reducing reagents and which comprises 95% cuprous sulfide, 1% silver oxide, 3% lead metaborate and 1% zinc sulfide.

References Cited

UNITED STATES PATENTS

| 2,701,215 | 2/1955 | Kroeck | 65—30 |
| 2,927,042 | 3/1960 | Hall et al. | 117—123 X |
| 1,977,625 | 10/1934 | Ernst | 117—124 |
| 2,075,446 | 3/1937 | Leibig | 117—124 X |
| 2,662,035 | 12/1953 | Levi | 106—34 X |

RALPH S. KENDALL, *Primary Examiner.*

HERBERT COHEN, *Assistant Examiner.*

U.S. Cl. X.R.

117—169; 106—34; 65—30